US009172451B2

(12) United States Patent
Trainin (10) Patent No.: US 9,172,451 B2
(45) Date of Patent: *Oct. 27, 2015

(54) METHOD AND DEVICES FOR MULTIPLE STATION SOUNDING IN A WIRELESS LOCAL AREA NETWORK (71) Applicant: Intel Corporation, Santa Clara, CA (US)

(72) Inventor: Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,431

(22) Filed: Oct. 9, 2014

(65) Prior Publication Data

US 2015/0092658 A1   Apr. 2, 2015

Related U.S. Application Data (63) Continuation of application No. 14/094,166, filed on Dec. 2, 2013, now Pat. No. 8,885,512, which is a continuation of application No. 12/843,663, filed on Jul. 26, 2010, now Pat. No. 8,630,195.

(51) Int. Cl.
*H04L 1/00* (2006.01)
*H04B 7/06* (2006.01)
(Continued)

(52) U.S. Cl.
CPC ............. *H04B 7/063* (2013.01); *H04B 7/0452* (2013.01); *H04B 7/0617* (2013.01); *H04W 24/10* (2013.01); *H04W 48/10* (2013.01); *H04W 72/0413* (2013.01); *H04W 84/12* (2013.01); *H04W 88/08* (2013.01)

(58) Field of Classification Search
CPC ..... H04W 24/00; H04W 24/01; H04W 24/02; H04W 24/03; H04W 24/04
USPC .......... 370/334, 349, 329, 330, 331, 252, 248
See application file for complete search history.

(56) References Cited

U.S. PATENT DOCUMENTS 8,630,195 B2   1/2014 Trainin
2007/0298742 A1   12/2007 Ketchum et al.
(Continued)

FOREIGN PATENT DOCUMENTS

WO   WO-2012018533 A2   2/2012
WO   WO-2012018533 A3   2/2012

OTHER PUBLICATIONS

"U.S. Appl. No. 12/843,663, Examiner Interview Summary mailed Apr. 3, 2013", 3 pgs.
"U.S. Appl. No. 12/843,663, Final Office Action mailed Dec. 13, 2012", 15 pgs.
"U.S. Appl. No. 12/843,663, Non Final Office Action mailed Jul. 24, 2012", 9 pgs.
(Continued)

*Primary Examiner* — Dady Chery
(74) *Attorney, Agent, or Firm* — Schwegman Lundberg & Woessner, P.A.

(57) ABSTRACT

Embodiments of a method and apparatus for obtaining sounding measurements between an access point and a wireless station within a wireless local area network are described. Some embodiments relate to Wi-Fi networks and networks operating in accordance with one of the IEEE 802.11 standards. Some embodiments may allow an access point to request that multiple stations compute sounding measurements with minimal time delay between measurements. Other embodiments may be described and claimed.

22 Claims, 5 Drawing Sheets (51) Int. Cl.
   *H04W 24/10*  (2009.01)
   *H04W 88/08*  (2009.01)
   *H04W 84/12*  (2009.01)
   *H04B 7/04*   (2006.01)
   *H04W 48/10*  (2009.01)
   *H04W 72/04*  (2009.01)

(56) References Cited

U.S. PATENT DOCUMENTS

| | | |
|---|---|---|
| 2009/0080355 A1 | 3/2009 | Song |
| 2009/0080365 A1 | 3/2009 | Song et al. |
| 2009/0080373 A1 | 3/2009 | Song |
| 2009/0196372 A1 | 8/2009 | Zhang et al. |
| 2010/0246467 A1 | 9/2010 | Song et al. |
| 2010/0260138 A1 | 10/2010 | Liu et al. |
| 2012/0020226 A1 | 1/2012 | Trainin |
| 2014/0160964 A1 | 6/2014 | Trainin |

OTHER PUBLICATIONS

"U.S. Appl. No. 12/843,663, Notice of Allowance mailed Sep. 16, 2013", 3 pgs.

"U.S. Appl. No. 12/843,663, Response filed Mar. 27, 2013 to Final Office Action mailed Dec. 13, 2012", 9 pgs.

"U.S. Appl. No. 14/094,166, Non Final Office Action mailed May 12, 2014", 5 pgs.

"U.S. Appl. No. 14/094,166, Notice of Allowance mailed Jul. 14, 2014", 5 pgs.

"U.S. Appl. No. 14/094,166, Response filed Jun. 27, 2014 to Non Final Office Action mailed May 12, 2014", 8 pgs.

"U.S. Appl. No. 12/843,663, Response filed Oct. 22, 2012 to Non Final Office Action mailed Jul. 24, 2012", 11 pgs.

"International Application Serial No. PCT/US2011/044767, International Preliminary Report on Patentability mailed Feb. 7, 2013", 6 pgs.

"International Application Serial No. PCT/US2011/044767, International Search Report mailed Feb. 9, 2012", 3 pgs.

"International Application Serial No. PCT/US2011/044767, International Written Opinion mailed Feb. 9, 2012", 4 pgs.

METHOD AND DEVICES FOR MULTIPLE STATION SOUNDING IN A WIRELESS LOCAL AREA NETWORK

PRIORITY APPLICATION

This application is a continuation of U.S. application Ser. No. 14/094,166, filed Dec. 2, 2013, now issued as U.S. Pat. No. 8,885,512, which is a continuation of U.S. application Ser. No. 12/843,663, filed Jul. 26, 2010, now issued as U.S. Pat. No. 8,630,195, all of which are incorporated herein by reference in their entirety.

TECHNICAL FIELD

Various embodiments described herein relate to apparatus and methods associated with wireless local area network communication. Some embodiments relate to Wireless Fidelity (Wi-Fi) networks and networks operating in accordance with one of the IEEE 802.11 standards. Some embodiments relate to communications and data transmission between an access points (AP) and wireless local area network devices or stations (STAs).

BACKGROUND

In a wireless local area network it is occasionally useful to perform sounding measurements of the communications environment between the access point and the wireless stations. These sounding measurements may provide data for use in beamforming and multiple input multiple output (MIMO) antenna operations. It is often desirable for an access point to request sounding information from multiple stations in parallel in order to obtain this information while maintaining singular communication link conditions.

Currently, an access point may request a sounding from a station by sending an announce message followed by a null data packet (NDP) sounding message directed to that station. This procedure may be repeated for each station, which can be time consuming and inefficient and may result in an unacceptable delay between the sounding measurements performed at each of the stations.

Thus, there are general needs for apparatus and efficient methods for an access point to request that multiple stations compute sounding measurements with minimal time delay between measurements.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
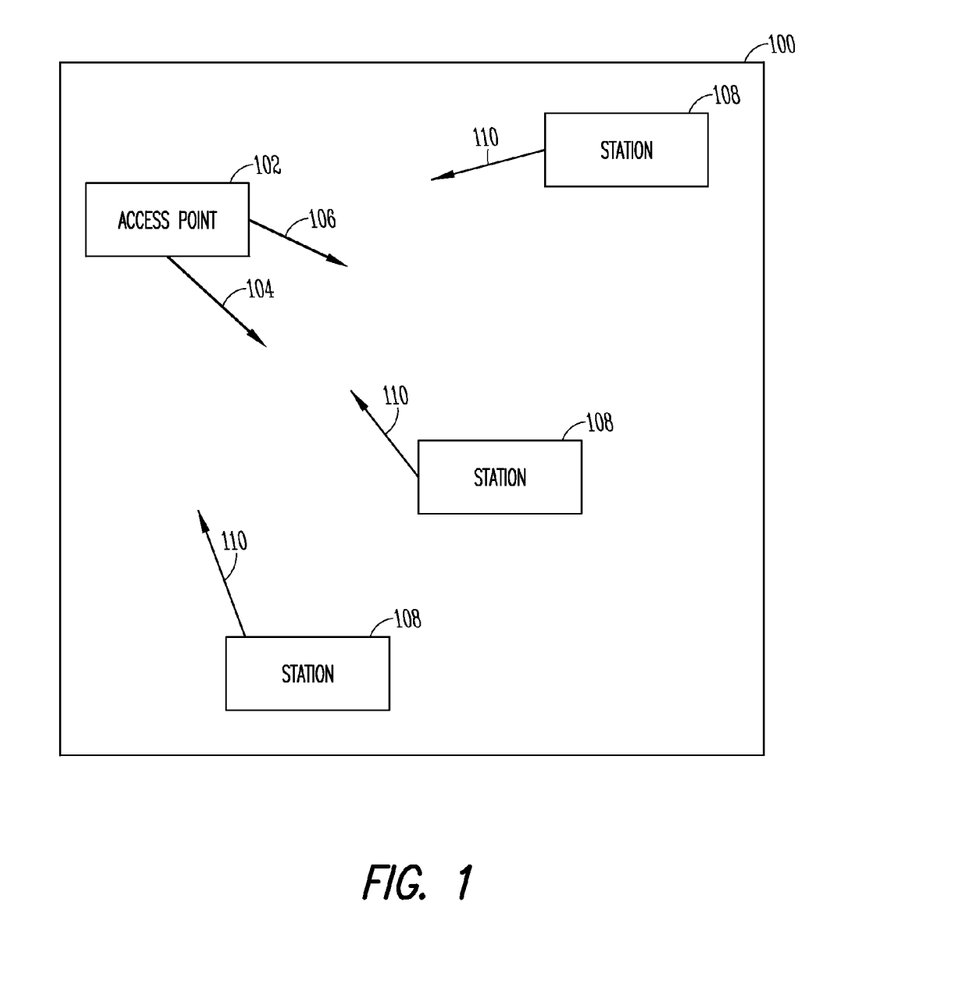
FIG. 1 illustrates an access point and wireless stations in a wireless local area network, in accordance with some embodiments.

FIG. 1 illustrates an access point and wireless stations in a wireless local area network in accordance with some embodiments. Wireless network 100 includes an access point (AP) 102 and one or more stations (STAs) 108. In some embodiments, the wireless network 100 may be a Wi-Fi network in accordance with specific communication standards, such as the Institute of Electrical and Electronics Engineers (IEEE) standards, including IEEE 802.11-2007 and/or 802.11(n) standards and/or proposed specifications for WLANs including the IEEE 802.11(ac) standard.

In the wireless network 100 it may be useful to perform sounding measurements of the communications environment between the AP 102 and the STAs 108. These sounding measurements may provide data for use in beamforming and multiple input multiple output (MIMO) antenna operations.

In some embodiments, AP 102 may request soundings from STAs 108 by transmitting an announce message 104 and a null data packet (NDP) sounding message 106, which may be received by STAs 108. In response, the STAs 108 may compute sounding measurements 110 and transmit them back to AP 102. In some embodiments, the announce message 104 may precede the NDP sounding message 106 or the NDP sounding message 106 may precede the announce message 104.

In some embodiments, it may be advantageous for an AP 102 to request sounding information from multiple STAs 108 in parallel in order to minimize the effect of changing communication link conditions. This may be useful, for example, in the case of beamforming on the downlink (DL) multiuser (MU) MIMO transmission. In some embodiments, this may be accomplished by transmitting the announce message 104 as a broadcast message containing the unicast recipient addresses (RAs) of the STAs 108 for which sounding is desired. In some embodiments, this may be accomplished by transmitting the announce message 104 as a multicast message containing the group address for the group of STAs 108 for which sounding is desired. In some embodiments, this may be accomplished by transmitting the announce message 104 as a multicast message associating a list of unicast RAs of the STAs 108 for which sounding is desired with a multicast group address.

In some embodiments, the order of the RAs in the announce message 104 may determine the order in which the STAs 108 respond with sounding measurements 110.

Although three STAs 108 are presented for illustrative purposes, any number of STAs may be employed.

Figure 2:
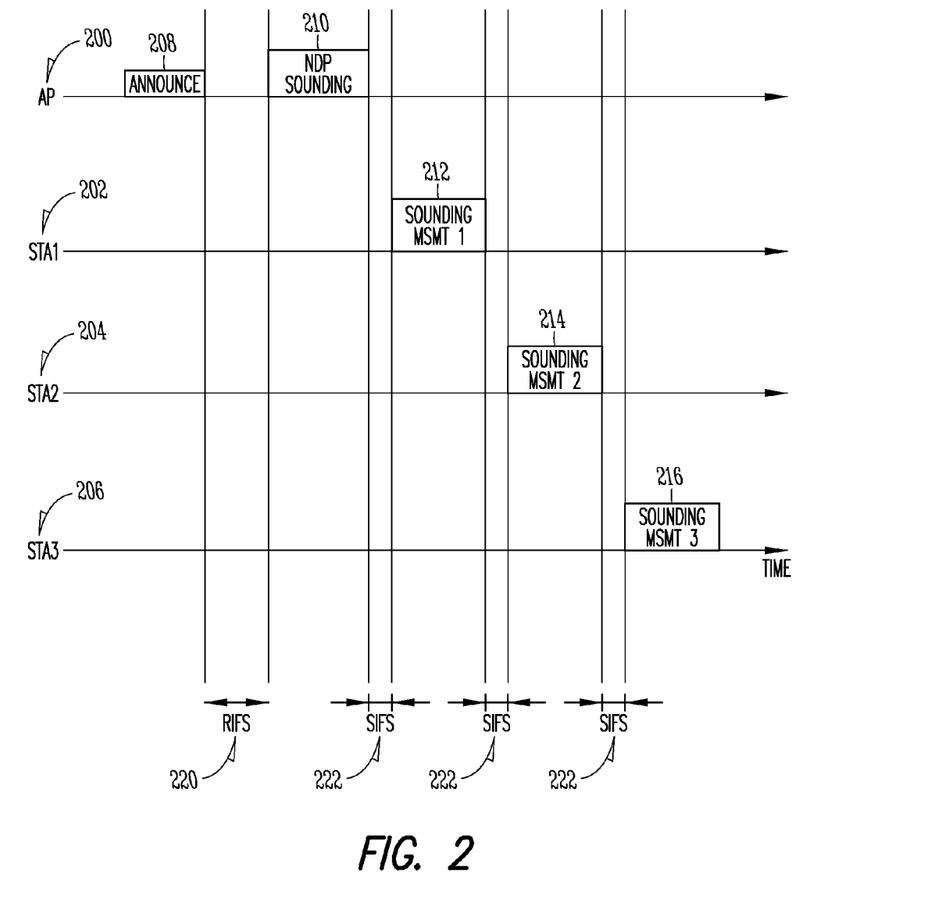
FIG. 2 illustrates a transmission timeline between the access point and the wireless stations, in accordance with some embodiments.

FIG. 2 illustrates a transmission timeline between the access point and the wireless stations, in accordance with some embodiments. AP 200 transmits an announce message 208 and an NDP sounding message 210. In some embodiments, the announce message 208 may precede the NDP sounding message 210 or the NDP sounding message 210 may precede the announce message 208. The time interval between the announce message 208 and the NDP sounding message 210 may be a reduced interframe spacing (RIFS) 220 as shown. In some embodiments, the time interval between the announce message 208 and the NDP sounding message 210 may be a short interframe spacing (SIFS) 222.

Stations STA1 202, STA2 204 and STA3 206 respond to the NDP sounding message 210 by computing and transmitting sounding measurements 212, 214 and 216. Although three STAs are presented for illustrative purposes, any number of STAs may be employed. The time interval between the sounding measurements 212, 214 and 216 may be a short interframe spacing (SIFS) 222.

Figure 3:
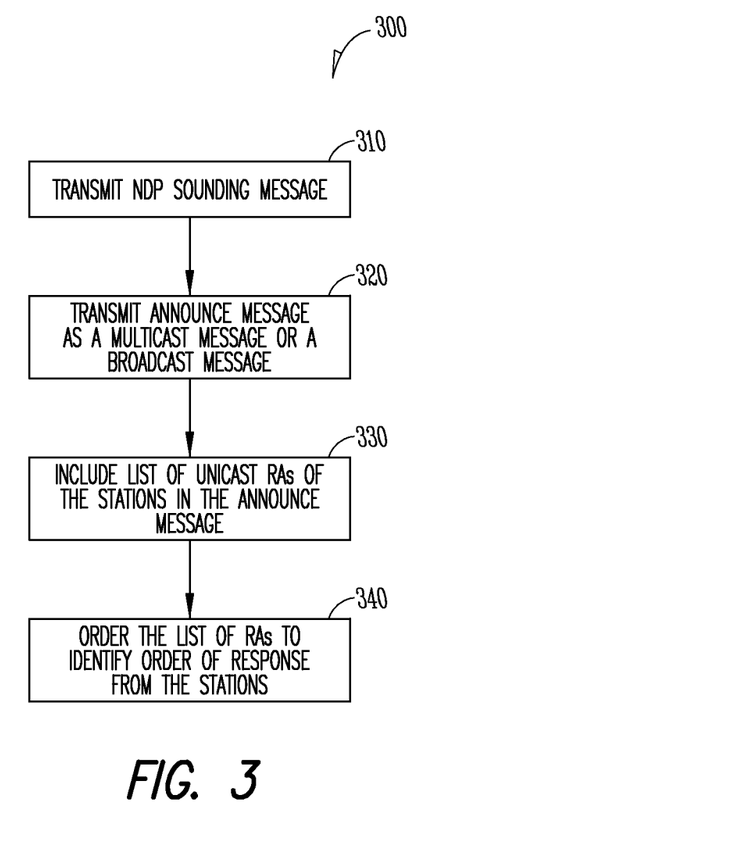
FIG. 3 illustrates a procedure for an access point to request sounding measurements, in accordance with some embodiments.

FIG. 3 illustrates a procedure for an access point to request sounding measurements, in accordance with some embodiments. Procedure 300 may be performed by an AP, such as AP 102 (FIG. 1). Operation 310 comprises transmitting an NDP sounding message from the AP to the STAs. Operation 320 comprises transmitting an announce message from the AP to the STAs. The announce message may be a multicast message or a broadcast message. Operation 330 comprises including a list of unicast RAs of the STAs for which a sounding measurement is requested in the announce message. Operation 340 comprises ordering the list of RAs to identify the order of response from the STAs.

Figure 4:
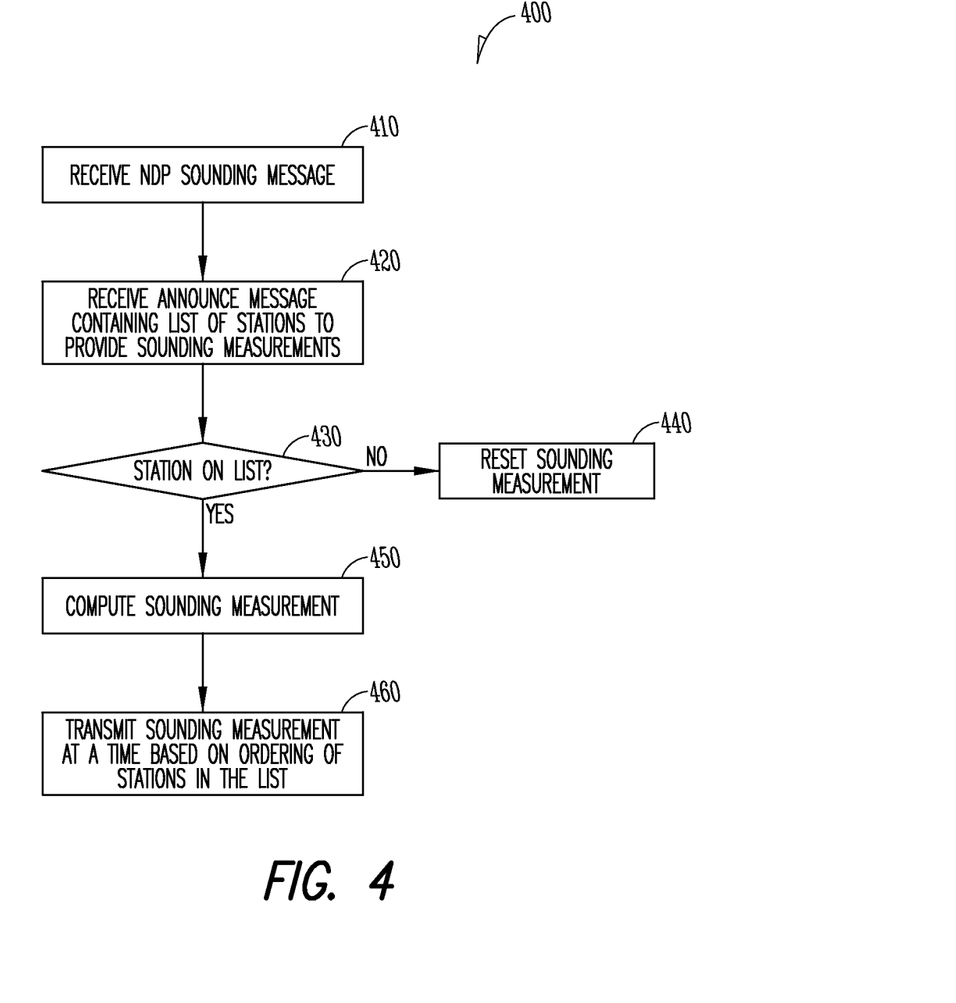
FIG. 4 illustrates a procedure for a wireless station to respond to a sounding request, in accordance with some embodiments.

FIG. 4 illustrates a procedure for a wireless station to respond to a sounding request, in accordance with some embodiments. Procedure 400 may be performed by an STA, such as STA 108 (FIG. 1). Operation 410 comprises receiving an NDP sounding message from the AP. Operation 420 comprises receiving an announce message from the AP containing a list of STAs to provide sounding measurements. Operation 430 comprises determining if the STA is on the list. Operation 440 comprises resetting the sounding measurement if the STA is not on the list. Operation 450 comprises computing a sounding measurement if the STA is on the list. Operation 460 comprises transmitting the sounding measurement at a time based on the ordering of the STAs in the list. In some embodiments, the time of transmission is determined such that a short interframe spacing (SIFS) is achieved between the sounding measurement transmissions from each STA.

Although the individual operations of procedures 300 and 400 are illustrated and described as separate operations, one or more of the individual operations may be performed concurrently, and nothing requires that the operations be performed in the order illustrated. Furthermore, some operations may be optional.

Figure 5:
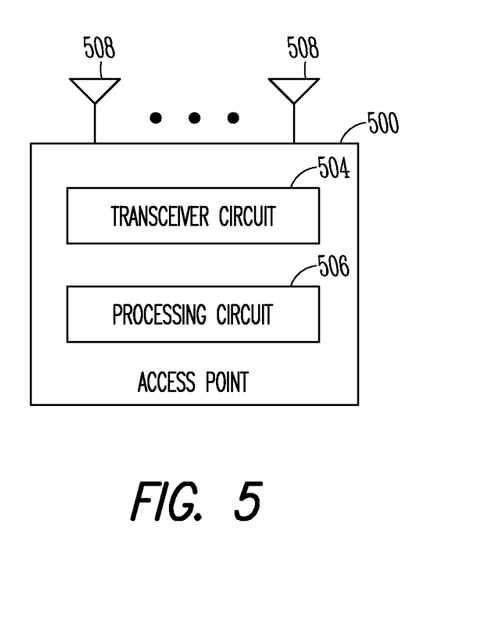
FIG. 5 illustrates a functional block diagram of an access point, in accordance with some embodiments.

FIG. 5 illustrates a functional block diagram of an access point, in accordance with some embodiments. Access point 500 may include a transceiver circuit 504 and a processing circuit 506. Transceiver circuit 504 may be coupled to one or more antennas 508 for transmitting and receiving messages from wireless stations, such as STA 108 (FIG. 1). In accordance with some embodiments, the AP 500 may be configured to operate in a wireless local area network. In some embodiments, the wireless local area network may be a Wi-Fi network operating in accordance with the 802.11 standard.

In these embodiments, the processing circuit 506 may determine a plurality of STAs which are to provide a sounding measurement. In these embodiments, the transceiver circuit 504 may transmit an NDP sounding message and an announce message. The announce message may identify the plurality of STAs which are to provide a sounding measurement in response to the NDP sounding message. In some embodiments, the transceiver circuit 504 may transmit the NDP sounding message prior to the announce message.

In some embodiments, the transceiver circuit 504 may transmit the announce message as a multicast message. In some embodiments, the transceiver circuit 504 may transmit the announce message as a broadcast message. In some embodiments, the announce message may contain a list of unicast recipient addresses (RAs) of the STAs.

In some embodiments, the processing circuit 506 may further order the list of RAs to identify an order of the response sounding measurements of the STAs.

Figure 6:
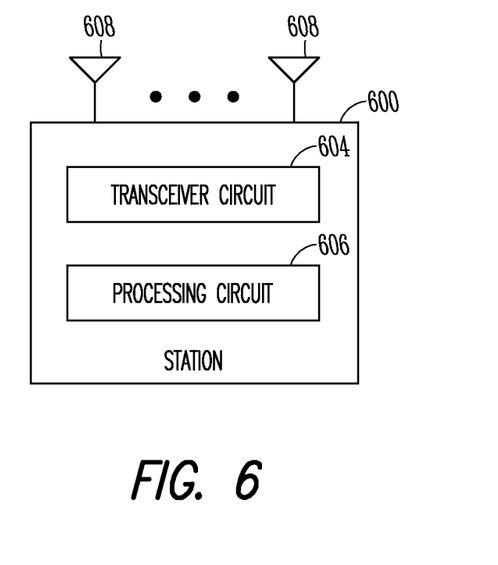
FIG. 6 illustrates a functional block diagram of a wireless station, in accordance with some embodiments.

FIG. 6 illustrates a functional block diagram of a wireless station in accordance with some embodiments. Station 600 may include a transceiver circuit 604 and processing circuit 606. Transceiver circuit 604 may be coupled to one or more antennas 608 for transmitting and receiving messages from access points, such as AP 102 (FIG. 1). In accordance with some embodiments, the STA 600 may be configured to operate in a wireless local area network. In some embodiments, the wireless local area network may be a Wi-Fi network operating in accordance with the 802.11 standard.

In these embodiments, the transceiver circuit 604 may receive an NDP sounding message and an announce message. The announce message may identify a plurality of STAs which are to provide a sounding measurement in response to the NDP sounding message. In some embodiments, the transceiver circuit 604 may receive the NDP sounding message prior to the announce message.

In these embodiments, the processor circuit 606 may recognize that the STA is one of the plurality of STAs identified in the announce message. In some embodiments, the processor circuit 606 may further compute a sounding measurement in response to the recognition.

In some embodiments, the processing circuit 606 may further recognize that the STA is not one of the plurality of STAs identified in the announce message and may then reset the sounding measurement in response to the recognition.

In some embodiments the transceiver circuit 604 further transmits a computed sounding measurement. In some embodiments, the transceiver circuit 604 transmits the sounding measurement at a time based on the ordering of the STAs in the announce message. In some embodiments, the time of transmission is determined such that a short interframe spacing (SIFS) is achieved between the sounding measurement transmissions from each STA.

In some embodiments, STA 600 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a smart phone, or other device that may receive and/or transmit information wirelessly.

Antennas 508 and 608 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 508 and 608 may be effectively separated to take advantage of spatial diversity and the different channel characteristics that may result between each of antennas 508 and 608.

Although AP 500 and STA 600 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs) and combinations of various hardware and logic circuitry for performing at least the functions described herein. In some embodiments, the functional elements of AP 500 and STA 600 may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable medium may include any tangible medium for storing in a form readable by a machine (e.g., a computer). For example, a computer-readable medium may include read-only memory (ROM), random-access memory (RAM), magnetic disk storage media, optical storage media, and flash-memory devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. Wireless communications circuitry adapted for operation in a wireless station, the circuitry operable to:
   receive a Very High Throughput (VHT) null data packet (NDP) Announcement message received at the wireless station, the VHT NDP Announcement message including an identification for one or more wireless stations (STAs);
   receive a NDP message received at the wireless station;
   determine whether an identifier of the wireless station is indicated first in the identification for the one or more STAs included in the VHT NDP Announcement message; and
   responsive to determining that the identifier of the wireless station is listed first in the identification for the one or more STAs:
      calculate a VHT Compressed Beamforming feedback message based upon the NDP message; and
      cause transmission of the VHT Compressed Beamforming feedback message a short interframe space (SIFS) after receipt of the NDP message.

2. The wireless communications circuitry of claim 1, wherein the wireless communications circuitry operates in accordance with an IEEE 802.11ac standard.

3. The wireless communications circuitry of claim 2, wherein the wireless communications circuitry is further operable to process a subsequent downlink multiple user multiple input multiple output (MU-MIMO) transmission received by the wireless station, the subsequent downlink MU-MIMO transmission being generated based on the VHT Compressed Beamforming feedback message.

4. The wireless communications circuitry of claim 2, wherein the wireless communications circuitry is further operable to process a subsequent downlink beamformed signal received by the wireless station, the subsequent downlink beamformed signal being generated based on the VHT Compressed Beamforming feedback message.

5. The wireless communications circuitry of claim 4, wherein the NDP message is received a short interframe space (SIFS) after receiving the VHT NDP Announcement message.

6. The wireless communications circuitry of claim 2, wherein the wireless communications circuitry is included in: a laptop computer, a smart phone, or a tablet.

7. At least one non-transitory machine readable medium that stores instructions which when performed by a wireless communications circuitry of a wireless station, cause the wireless station to perform operations comprising:
   processing a Very High Throughput (VHT) null data packet (NDP) Announcement message, the VHT NDP Announcement message including a listing of one or more wireless stations (STAs);
   processing a NDP message;
   determining whether an identifier of the wireless station is first in the listing for the one or more STAs included in the VHT NDP Announcement message; and
   responsive to determining that the identifier of the wireless station is first in the listing of the one or more STAs:
      calculating a VHT Compressed Beamforming feedback message based upon the NDP message; and
      causing transmission of the VHT Compressed Beamforming feedback message a short interframe space (SIFS) after receipt of the NDP message.

8. The machine readable medium of claim 7, wherein the VHT NDP Announcement message is a broadcast message transmitted via a wireless network to respective devices of the one or more STAs, the respective devices of the one or more STAs including the wireless station.

9. The machine readable medium of claim 7, wherein the VHT Compressed Beamforming feedback message provides information used to affect beamforming parameters calculated for the wireless station with subsequent wireless transmissions.

10. The machine readable medium of claim 7, wherein the VHT NDP Announcement message and the NDP message are transmitted to the wireless station via a wireless network operating in accordance with an IEEE 802.11ac standard.

11. The machine readable medium of claim 7, wherein the NDP message is received a short interframe space (SIFS) after receiving the VHT NDP Announcement message.

12. At least one non-transitory machine readable medium that stores instructions which when performed by an Access Point (AP), cause the AP to perform operations comprising:
   transmitting a Very High Throughput (VHT) null data packet (NDP) Announcement message, the VHT NDP Announcement message including an identification of one or more wireless stations (STAs), the identification of the one or more STAs including identifiers for the one or more STAs which are to provide respective VHT Compressed Beamforming feedback messages in response to a NDP message;
   transmitting the NDP message for the one or more STAs; and
   receiving, at respective times, the respective VHT Compressed Beamforming feedback messages from the one or more of the STAs in response to the NDP message, wherein the VHT NDP Announcement message is used by at least one of the one or more STAs to determine a timing for transmitting a particular VHT Compressed Beamforming feedback message to the AP.

13. The machine readable medium of claim 12, wherein the AP operates in a wireless network in accordance with an IEEE 802.11(ac) standard.

14. The machine readable medium of claim 13, the operations further comprising performing a downlink multiple user multiple input multiple output (MU-MIMO) transmission to a particular wireless station of the one or more STAs, the MU-MIMO transmission configured based on the particular VHT Compressed Beamforming feedback message received from the particular wireless station.

15. The machine readable medium of claim 12, the operations further comprising receiving a first VHT Compressed Beamforming feedback message from a first wireless station of the one or more STAs prior to receiving a second VHT Compressed Beamforming feedback message from a second wireless station of the one or more STAs.

16. The machine readable medium of claim 12, wherein the VHT NDP Announcement message is a broadcast message.

17. The machine readable medium of claim 12, wherein the NDP message is transmitted to the one or more STAs a short interframe space (SIFS) after transmitting the VHT NDP Announcement message.

18. A wireless communications circuitry comprising:
a processing circuit to:
generate a Very High Throughput (VHT) null data packet (NDP) Announcement message; and
generate a NDP message;
wherein the VHT NDP Announcement Message includes an identification of one or more wireless stations (STAs), the identification of the one or more STAs including identifiers for the one or more STAs which are to provide respective VHT Compressed Beamforming feedback messages; and
a transceiver circuit to:
transmit the VHT NDP Announcement message;
transmit the NDP message; and
receive the respective VHT Compressed Beamforming feedback messages;
wherein the VHT Compressed Beamforming feedback messages are received at respective times from the one or more of the STAs in response to the NDP message, wherein the VHT NDP Announcement message is used by at least one of the one or more STAs to determine a timing for transmission of a particular VHT Compressed Beamforming feedback message.

19. The wireless communications circuitry of claim 18, wherein the wireless communications circuitry is included in an access point (AP) configured to operate in accordance with an IEEE 802.11(ac) standard.

20. The wireless communications circuitry of claim 18, wherein the transceiver circuit performs a subsequent downlink multiple user multiple input multiple output (MU-MIMO) transmission with at least one of the one or more STAs based on the respective VHT Compressed Beamforming feedback messages.

21. The wireless communications circuitry of claim 18, wherein the VHT NDP Announcement message is a broadcast message.

22. The wireless communications circuitry of claim 18, wherein the transceiver circuit is to receive a first VHT Compressed Beamforming feedback message from a first wireless station of the one or more STAs prior to receiving a second VHT Compressed Beamforming feedback message from a second wireless station of the one or more STAs.

\* \* \* \* \*